(12) United States Patent
Tanaka et al.

(10) Patent No.: US 8,100,222 B2
(45) Date of Patent: Jan. 24, 2012

(54) STEERING APPARATUS

(75) Inventors: Hajime Tanaka, Toyota (JP); Tomonari Yamakawa, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/808,064

(22) PCT Filed: Dec. 12, 2008

(86) PCT No.: PCT/IB2008/003441
§ 371 (c)(1),
(2), (4) Date: Jul. 28, 2010

(87) PCT Pub. No.: WO2009/077838
PCT Pub. Date: Jun. 25, 2009

(65) Prior Publication Data
US 2010/0285889 A1 Nov. 11, 2010

(30) Foreign Application Priority Data
Dec. 14, 2007 (JP) .................. 2007-323538

(51) Int. Cl.
*B62D 5/04* (2006.01)
(52) U.S. Cl. ....................................... 180/444

(58) Field of Classification Search .................. 180/444
See application file for complete search history.

(56) References Cited

U.S. PATENT DOCUMENTS

| 5,156,228 A | 10/1992 | Kato et al. |
| 5,303,793 A | 4/1994 | Kato et al. |
| 2006/0151235 A1* | 7/2006 | Chikaraishi .................. 180/444 |

FOREIGN PATENT DOCUMENTS

| DE | 41 02 913 | 8/1991 |
| JP | 3 227772 | 10/1991 |
| JP | 2005 178519 | 7/2005 |
| JP | 2006 27537 | 2/2006 |

* cited by examiner

*Primary Examiner* — Tony H. Winner
(74) *Attorney, Agent, or Firm* — Oblon, Spivak, McClelland, Maier & Neustadt, L.L.P.

(57) ABSTRACT

A steering apparatus includes an input shaft that transmits a steering force input from a steering wheel and an output shaft that transmits a steered force by which wheels are steered. The output shaft is arranged at a position that is radially offset from the input shaft. One of an eccentric cam and an adapting plate that form an eccentric pin mechanism is connected to the input shaft. The output shaft is connected to the other one of the eccentric cam and the adapting plate. A first connecting portion of the input shaft, which is connected to the eccentric pin mechanism, is connectable to a second connecting portion of the output shaft, which is connected to the eccentric pin mechanism.

10 Claims, 6 Drawing Sheets

STEERING APPARATUS

BACKGROUND OF THE INVENTION

1. Field of the Invention

The invention relates to a steering apparatus used in a vehicle, such as a passenger car, a truck and a bus.

2. Description of the Related Art

A steering apparatus used in a vehicle, for example, includes a steering wheel, a column shaft, a torque sensor input shaft, an intermediate shaft, and a rack-and-pinion mechanism. The column shaft is rotatably supported by a column tube. The above steering apparatus includes an eccentric pin mechanism that provides a variable ratio of a steering angle input from the steering wheel to a steered angle of the torque sensor input shaft, which is, for example, described in Japanese Patent Application Publication No. 3-227772 (JP-A-3-227772).

However, for applying the eccentric pin mechanism to a steering apparatus, it is necessary for both the column shaft and the torque sensor input shaft to include a structure such that one of an eccentric cam and an adapting plate that constitute the eccentric pin mechanism is connected to the column shaft and the other one of the eccentric cam and the adapting plate is connected to the torque sensor input shaft. Thus, it is difficult to use common components, such as the column shaft and torque sensor input shaft, between a steering apparatus that has no eccentric pin mechanism and a steering apparatus that has an eccentric pin mechanism.

SUMMARY OF THE INVENTION

The invention provides a steering apparatus that is able to use common components irrespective of whether the steering apparatus has an eccentric pin mechanism.

An aspect of the invention relates to a steering apparatus that includes: an eccentric pin mechanism that is formed of an eccentric cam and an adapting plate; an input shaft that transmits a steering force input from a steering wheel; and an output shaft that transmits a steered force by which wheels are steered. In the above steering apparatus, the output shaft is arranged at a position that is radially offset from the input shaft, one of the eccentric cam and the adapting plate is connected to the input shaft, the output shaft is connected to the other one of the eccentric cam and the adapting plate, and a first connecting portion of the input shaft, which is connected to the eccentric pin mechanism, is connectable to a second connecting portion of the output shaft, which is connected to the eccentric pin mechanism.

In the steering apparatus according to the aspect of the invention, the eccentric cam may have a first protrusion, the input shaft may have a first recess that constitutes the first connecting portion and that is connectable to the first protrusion, the adapting plate may have a second recess, and the output shaft may have a second protrusion that constitutes the second connecting portion and that is connectable to the second recess. According to the above structure, the second connecting portion may be formed so as to be connectable to the first connecting portion with a further simple structure.

In the steering apparatus according to the aspect of the invention, the first protrusion and the second protrusion each may have a circular column shape, and the outer diameter of the first protrusion may be equal to the outer diameter of the second protrusion. According to the above structure, the second connecting portion may be formed with a further simple structure. As described above, by forming the second connecting portion connectable to the first connecting portion, common components that constitute the steering apparatus, mainly formed of the input shaft and the output shaft, may be used irrespective of whether the steering apparatus has the eccentric pin mechanism. Thus, it is possible to form the steering apparatus that has the eccentric pin mechanism without significantly changing the structure of the input shaft and components adjacent to the steering wheel and the structure of the output shaft and components adjacent to the wheels.

The steering apparatus according to the aspect of the invention may further include an accommodation member that accommodates the eccentric pin mechanism, an input-side accommodation member that accommodates the input shaft and an output-side accommodation member that accommodates the output shaft. The accommodation member may be formed separately from the input-side accommodation member and the output-side accommodation member. According to the above structure, the common input-side accommodation member and the common output-side accommodation member may be used irrespective of whether the steering apparatus has the eccentric pin mechanism.

In the steering apparatus according to the aspect of the invention, the output shaft may include torque detecting means. According to the above structure, in the steering apparatus (EPS: electronic power steering) equipped with an electric power multiplying device, common components that constitute the steering apparatus, mainly formed of the input shaft and the output shaft, may be used irrespective of whether the steering apparatus has the eccentric pin mechanism.

The steering apparatus according to the aspect of the invention may further include assist force generating means that generates an assist force on the basis of a torque detected by the torque detecting means. According to the above structure, in the steering apparatus (EPS: electronic power steering) equipped with the assist force generating means, that is, an electric power multiplying device, common components that constitute the steering apparatus, mainly formed of the input shaft and the output shaft, may be used irrespective of whether the steering apparatus has the eccentric pin mechanism.

In the steering apparatus according to the aspect of the invention, the first protrusion may have a key that is key-connected with the first recess, and the outer diameter of the first protrusion may be the diameter of an outermost peripheral surface of a portion other than the key. In addition, in the steering apparatus according to the aspect of the invention, the second protrusion may have a key that is key-connected with the second recess, and the outer diameter of the second protrusion may be the diameter of an outermost peripheral surface of a portion other than the key.

In the steering apparatus according to the aspect of the invention, the first protrusion may have a serration that is serration-connected with the first recess, the second protrusion may have a serration that is serration connected with the second recess, the outer diameter of the first protrusion may be the diameter of an outermost peripheral surface of the first protrusion, and the outer diameter of the second protrusion may be the diameter of an outermost peripheral surface of the second protrusion.

In the steering apparatus according to the aspect of the invention, the first protrusion and the second protrusion each may have a polygonal column shape.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1A:
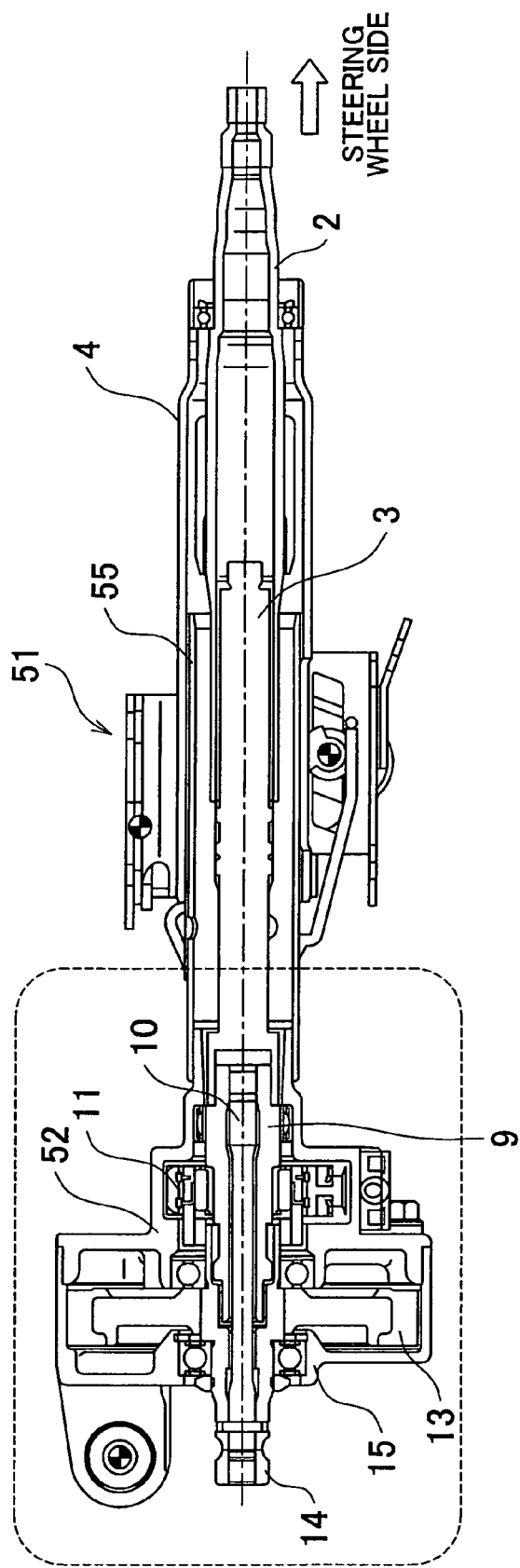
FIG. 1A and FIG. 1B are schematic views that show steering apparatuses according to an embodiment of the invention.
Figure 1B:
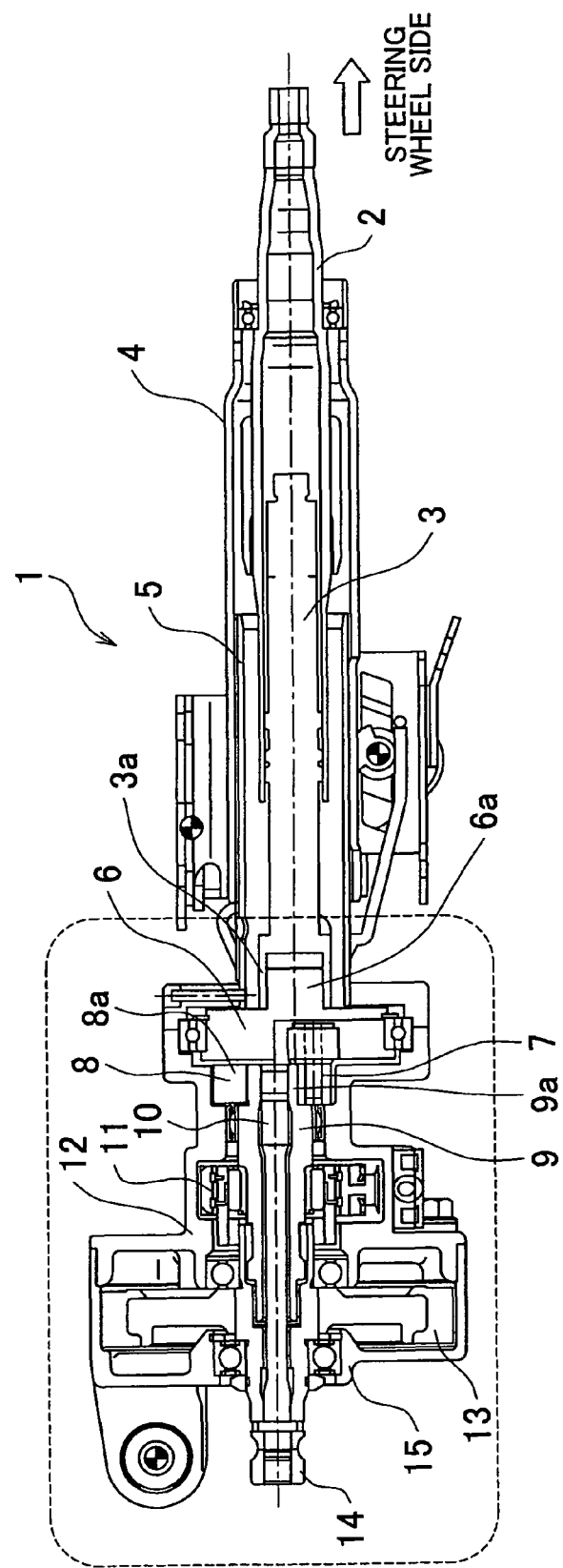
Figure 2A:
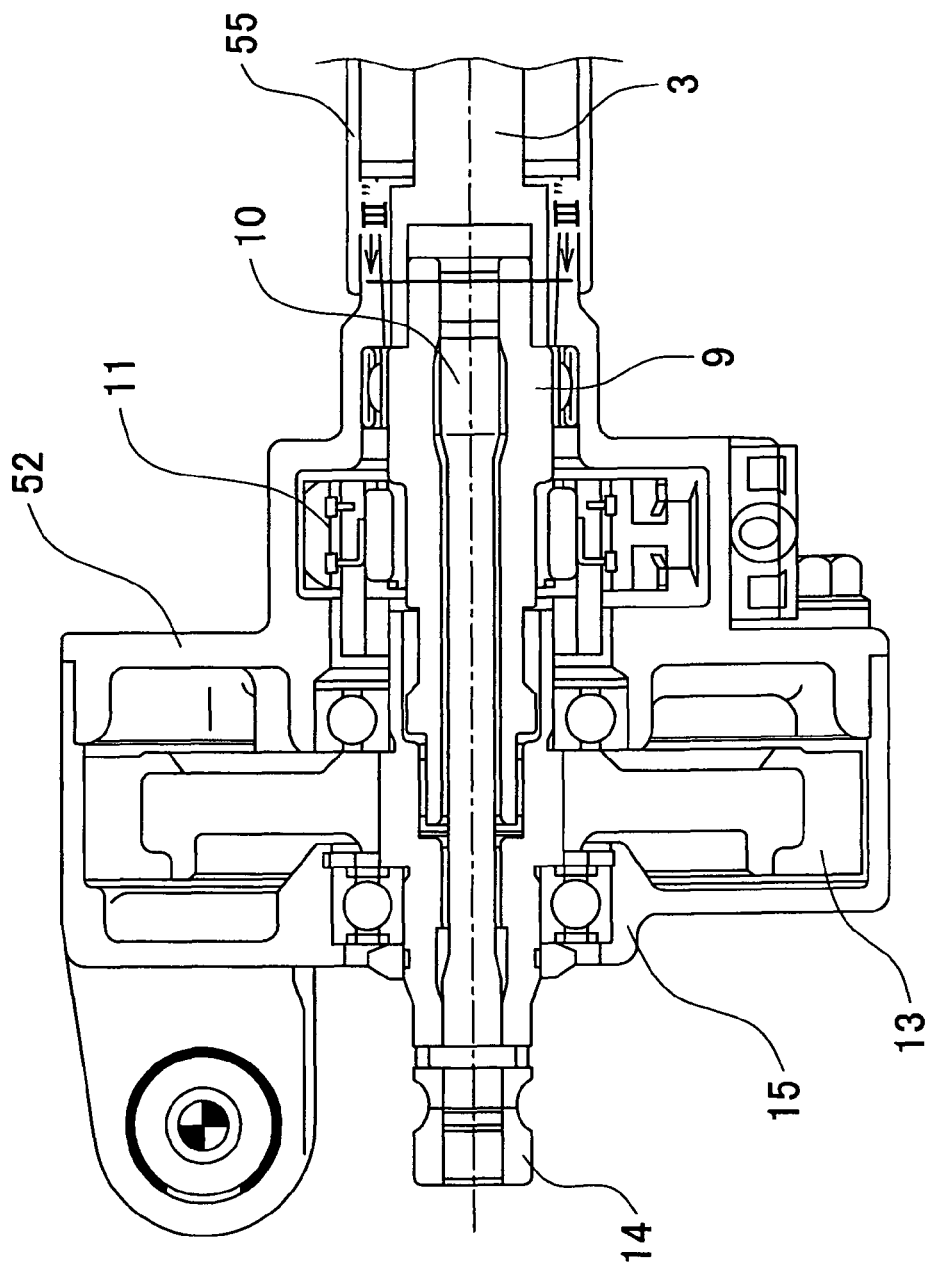
FIG. 2A and FIG. 2B are schematic views that show the steering apparatuses according to the embodiment of the invention.
Figure 2B:
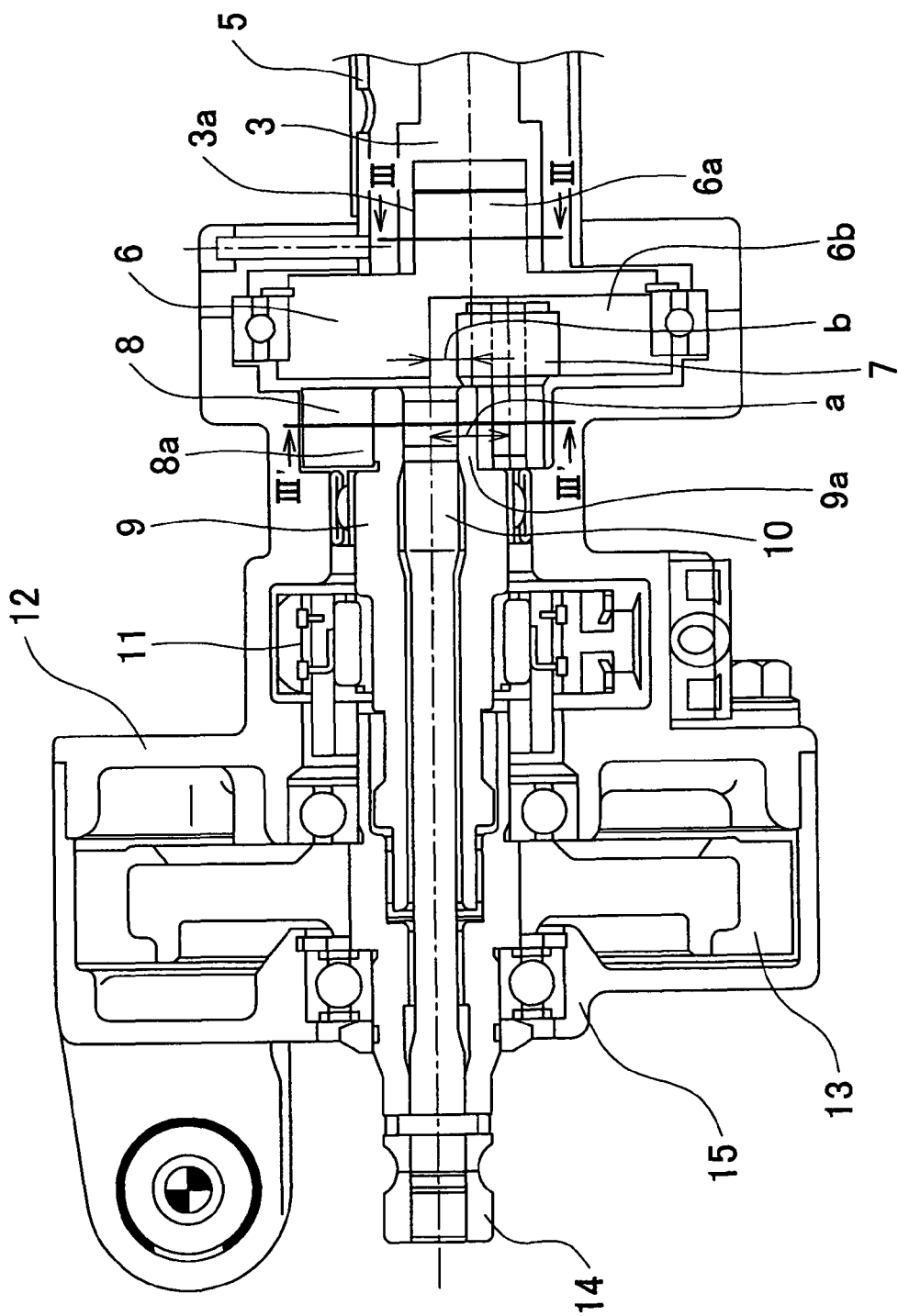
Figure 3:
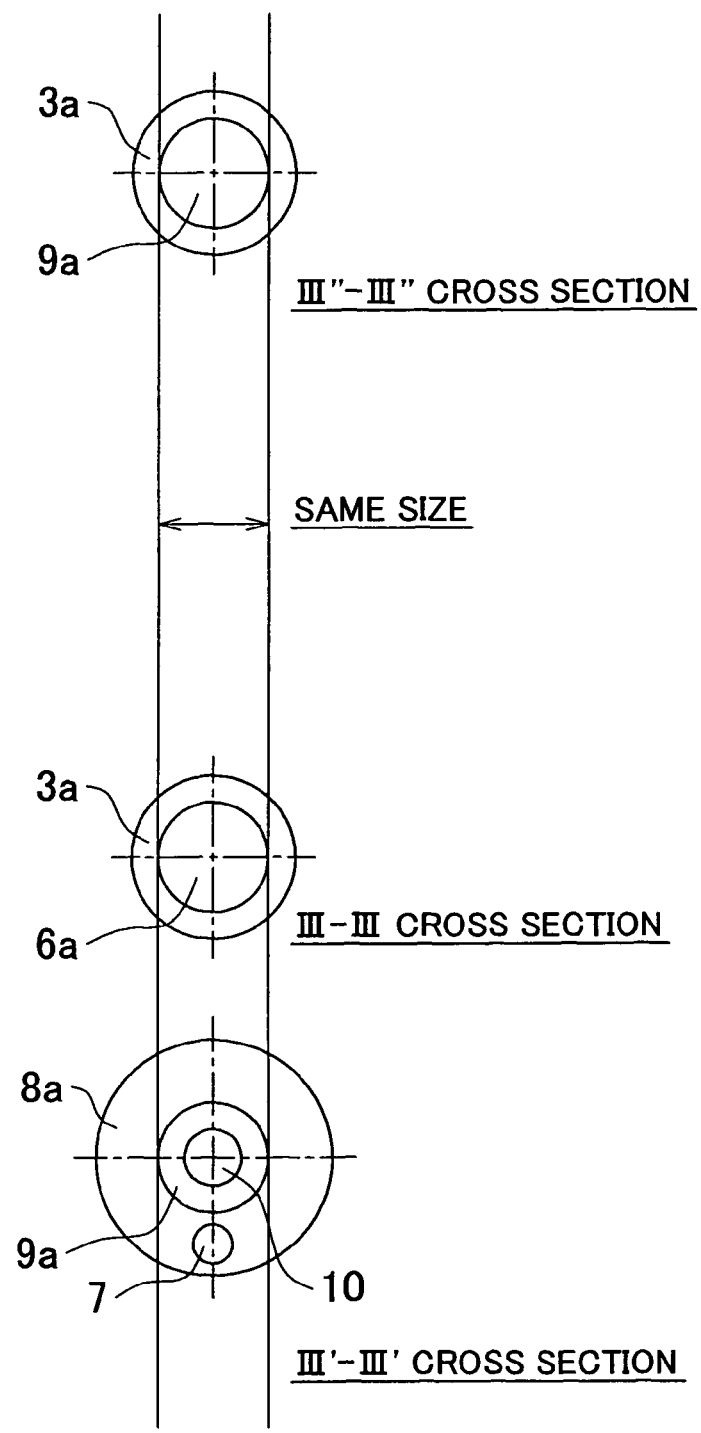
FIG. 3 is a schematic view that shows the steering apparatus according to the embodiment of the invention.
Figure 4:
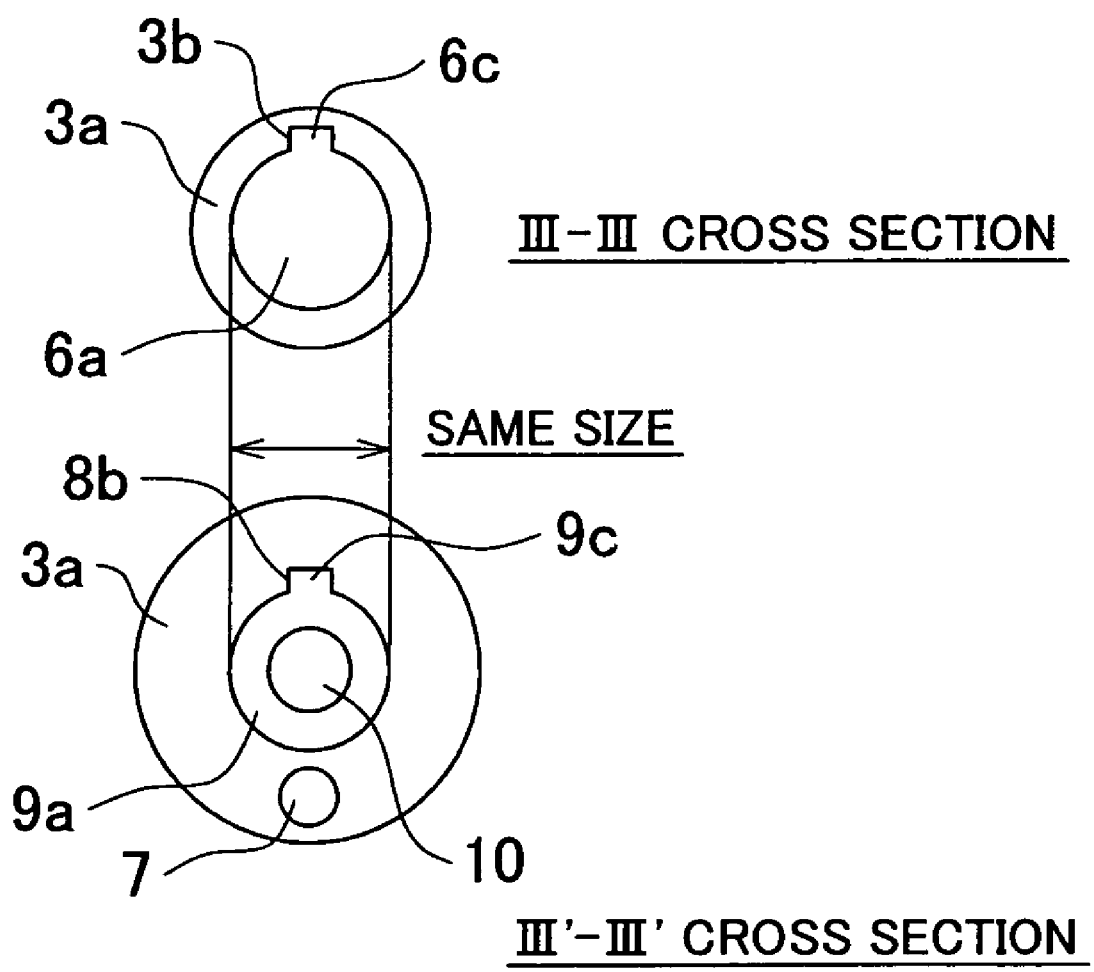
FIG. 4 is a schematic view that shows the steering apparatus according to the embodiment of the invention.

FIG. 1A and FIG. 1B are schematic views that show steering apparatuses according to an embodiment of the invention. FIG. 2A and FIG. 2B are schematic views that show the steering apparatuses according to the embodiment of the invention. Note that FIG. 2A and FIG. 2B are enlarged schematic views of portions surrounded by broken lines in FIG. 1A and FIG. 1B, respectively. FIG. 1A and FIG. 2A show a steering apparatus that has no eccentric pin mechanism. Furthermore, FIG. 3 shows schematic cross-sectional views that are respectively taken along the line III-III in FIG. 2B, the line III'-III' in FIG. 2B and the line III"-III" in FIG. 2A. FIG. 4 show schematic cross-sectional views that are respectively taken along the line III-III and the line III'-III' in FIG. 2A.

As shown in FIG. 1B and FIG. 2B, the steering apparatus 1 according to the present embodiment includes a steering wheel (not shown), a column shaft 2, a column shaft 3, an upper column tube 4, a lower column tube 5, an eccentric cam 6, an eccentric pin 7, an adapting plate 8, a torque sensor input shaft 9, a torsion bar 10, a torque sensor 11, a torque sensor housing 12, a worm wheel 13, an electronic power steering electronic control unit (EPSECU) (not shown), a motor (not shown), a lower shaft 14, and a worm housing 15.

The input side of the column shaft 2 is coupled to the steering wheel (not shown). The output side of the column shaft 2 has a hollow cylindrical shape. The column shaft 3 has a solid circular column shape. The column shaft 3 is serration-fitted inside the hollow cylindrical portion of the output side of the column shaft 2 so that it is axially displaceable. Thus, the column shaft 2 and the column shaft 3 form a structure that absorbs an axial displacement.

The column shaft 2 transmits a driver's steering force, input from the steering wheel (not shown), to the column shaft 3. The column shaft 3 transmits the steering force, input from the column shaft 2, to the eccentric cam 6. Thus, the column shaft 3 constitutes an input shaft for an eccentric pin mechanism that is formed of the eccentric cam 6, the eccentric pin 7 and the adapting plate 8.

The upper column tube 4 surroundingly accommodates the column shaft 2 and also rotatably supports the column shaft 2. The lower column tube 5 surroundingly accommodates the column shaft 3 and also rotatably supports the column shaft 3. The lower column tube 5 constitutes an input-side accommodation member.

The eccentric cam 6, the eccentric pin 7 and the adapting plate 8 are assembled together to form the eccentric pin mechanism. The eccentric cam 6 has a circular column-shaped first protrusion 6a that protrudes toward the input side. The output side of the column shaft 3 has a closed-end cylindrical first recess 3a to which the first protrusion 6a can be fitted for connection. The first recess 3a constitutes a first connecting portion of the column shaft 3, which is connected to the eccentric pin mechanism. These first recess 3a and first protrusion 6a respectively have serrations (not shown) or a key groove 3b and a key 6c shown in FIG. 4. By fitting the first protrusion 6a into the first recess 3a for connection, the eccentric cam 6 is coaxially connected to the output side of the column shaft 3.

The output side of the adapting plate 8 has a cylindrical second recess 8a that recedes from the output side toward the input side. The input side of the torque sensor input shaft 9, which serves as an output shaft, has a circular column-shaped second protrusion 9a that protrudes toward the input side. The second protrusion 9a can be fitted into the second recess 8a for connection. The second protrusion 9a constitutes a second connecting portion of the torque sensor input shaft 9, which is connected to the eccentric pin mechanism.

In addition, as shown in FIG. 3, the outer diameter, that is, the diameter, of the first protrusion 6a is the same as the outer diameter, that is, the diameter, of the second protrusion 9a. These second recess 8a and second protrusion 9a respectively have serrations (not shown) or a key groove 8b and a key 9b shown in FIG. 4. By fitting the second protrusion 9a into the second recess 8a for connection, the torque sensor input shaft 9, which serves as the output shaft, is coaxially connected to the adapting plate 8.

As described above, with the second protrusion 9a and the first recess 3a, the second protrusion 9a of the torque sensor input shaft 9, which is the second connecting portion connected to the adapting plate 8 that constitutes the eccentric pin mechanism, can be connected to the first recess 3a of the column shaft 3 (input shaft), which is the first connecting portion connected to the eccentric cam 6 that constitutes the eccentric pin mechanism.

The outer peripheral surface of the disc-shaped eccentric cam 6 is rotatably supported by the lower column tube 5 and the torque sensor housing 12 through a bearing. A surface of the eccentric cam 6, facing the adapting plate 8, has an eccentric cam groove 6b that extends radially outward from the central axis of the eccentric cam 6. The eccentric pin 7 provided on the adapting plate 8 is slidably fitted in the eccentric cam groove 6b. The central axis of the eccentric cam 6 is offset by a first offset amount from the central axis of the adapting plate 8.

The eccentric pin 7 is rotatably provided on the surface of the adapting plate 8, facing the eccentric cam 6, at a position at which the central axis of the eccentric pin 7 is offset by a second offset amount a, which is larger than the first offset amount b, from the central axis of the adapting plate 8. The eccentric pin 7 and the eccentric cam groove 6b of the eccentric cam 6 constitute the eccentric pin mechanism. In this manner, a variable steering angle mechanism provides a variable ratio of a steering angle of the column shaft 3, which serves as the input shaft, to a steered angle of the torque sensor input shaft 9, which serves as the output shaft. Note that the detailed structure is similar to that described in JP-A-3-227772, so the detailed description is omitted.

The torque sensor input shaft 9 has a hollow cylindrical shape. The input side of the torsion bar 10 is drivably serration-connected or key-connected to the inner peripheral surface of the input side of the torque sensor input shaft 9. Similarly, the output side of the torsion bar 10 is drivably serration-connected or key-connected to the inner peripheral side of the hollow cylindrical lower shaft 14.

The torque sensor input shaft 9 is arranged at a position that is radially offset by the first offset amount b from the column shaft 3, and is drivably connected to the lower shaft 14 by the torsion bar 10 so that it is circumferentially displaceable. The worm wheel 13 is drivably connected to the lower shaft 14.

The input side of the lower shaft 14 with respect to the worm wheel 13 is rotatably supported by the torque sensor housing 12 through a bearing. The output side of the lower shaft 14 with respect to the worm wheel 13 is rotatably supported by the worm housing 15 through a bearing.

The torque sensor 11 detects a driver's steering force, input from the steering wheel, corresponding to a relative displacement with respect to the lower shaft 14 of the torque sensor input shaft 9, and outputs the detected steering force to the EPSECU. The torque sensor 11 constitutes a torque detecting means. The torque sensor housing 12 has a hollow cylindrical shape. The input side of the torque sensor housing 12 is connected to the lower column tube 5. The torque sensor housing 12 constitutes an output-side accommodation member that accommodates the eccentric cam 6, the adapting plate 8, the torque sensor input shaft 9 and the torque sensor 11.

The EPSECU, for example, includes a CPU, a ROM, a RAM and a data bus that connects them with one another. In accordance with a program stored in the ROM, the CPU executes a process described below.

The EPSECU controls driving of the motor for generating an assist force on the basis of the steering force detected by the torque sensor 11. A driving force generated by the motor drives the worm wheel 13 and is then transmitted to the lower shaft 14. That is, the EPSECU, the motor and the worm wheel 13 constitute an assist force generating means that generates an assist force on the basis of a torque, that is, a steering force, detected by the torque sensor 11.

Although not shown in the drawing here, the output side of the lower shaft 14 is drivably connected to a pinion of the rack-and-pinion mechanism through the intermediate shaft. When a driver's steering force is input to the steering wheel, an assist force that is proportional to the steering force is generated at the motor by the control of the EPSECU. The assist force is transmitted through the worm wheel 13 to the lower shaft 14, the intermediate shaft, and the pinion of the rack-and-pinion mechanism, a rack bar is moved in the width direction of a vehicle, and then a tie rod, coupled to the rack bar at the outer sides in the width direction, steers wheels (not shown).

According to the above described steering apparatus 1 of the present embodiment, the following advantageous effects may be obtained. That is, the circular column-shaped second protrusion 9a is formed at the input side of the torque sensor input shaft 9, the cylindrical first recess 3a is formed at the output side of the column shaft 3, and the outer diameter of the circular column-shaped first protrusion 6a of the eccentric cam 6 is equal to the outer diameter of the circular column-shaped second protrusion 9a. Thus, the second protrusion 9a, which serves as the second connecting portion, may be formed so as to be connectable to the first recess 3a, which serves as the first connecting portion, with a further simple structure. In addition, the second protrusion 9a, which serves as the second connecting portion, may be formed with a further simple structure.

With the above structure, as shown in FIG. 1A and FIG. 2A, in a steering apparatus 51 that has no eccentric pin mechanism, the torque sensor input shaft 9 can be connected to the column shaft 3 without any changes.

In this way, by forming the second protrusion 9a, which serves as the second connecting portion, so as to be connectable to the first recess 3a, which serves as the first connecting portion, it is possible to provide a common column shaft 3, a common column shaft 2 and a common torque sensor input shaft 9 that constitute the steering apparatus 1 irrespective of whether the steering apparatus 1 has the eccentric pin mechanism formed of the eccentric cam 6, the eccentric pin 7 and the adapting plate 8.

Thus, in the steering apparatus 51 that has no eccentric pin mechanism, it is possible to form the steering apparatus 1 that has the eccentric pin mechanism without significantly changing the structure of the column shaft 3 and components adjacent to the steering wheel and the structure of the torque sensor input shaft 9 and components adjacent to the wheels.

Note that when the steering apparatus 51 that has no eccentric pin mechanism is formed by removing the eccentric cam 6, eccentric pin 7 and adapting plate 8 that form the eccentric pin mechanism, as shown in FIG. 2A, it is necessary to change the structure that allows direct connection between the lower column tube 55 and a torque sensor housing 52 so that, in comparison with the lower column tube 5 of the steering apparatus 1, the output side of the lower column tube 55 is modified to a structure such that the flanged radial projection for surrounding the eccentric cam 6 is removed, and the input side of the torque sensor housing 52 is also modified to a structure such that the flanged radial projection is removed. However, the other components may be made common to the steering apparatus 1 and the steering apparatus 51.

That is, as for the components other than the column shaft 3 and the torque sensor input shaft 9, such as the steering wheel (not shown), the column shaft 2, the upper column tube 4, the eccentric cam 6, the eccentric pin 7, the adapting plate 8, the torsion bar 10, the torque sensor 11, the worm wheel 13, the EPSECU (not shown), the motor (not shown), the lower shaft 14, and the worm housing 15, it is also possible to use common components between the steering apparatus 1 that has the eccentric pin mechanism and the steering apparatus 51 that has no eccentric pin mechanism.

In addition, by providing the torque sensor 11 on the torque sensor input shaft 9, in the steering apparatus 1 equipped with an electric power multiplying device, which serves as an assist force generating means, common components that constitute the steering apparatus 1, mainly formed of the column shaft 3 and the torque sensor input shaft 9, may be used irrespective of whether the steering apparatus has the eccentric pin mechanism.

The embodiment of the invention is described in detail above; however, the aspects of the invention are not limited to the above described embodiment. Various modifications or replacements may be added to the above described embodiment without departing from the scope of the invention.

For example, in the above described steering apparatus 1, the housing, which serves as the accommodation member that accommodates the eccentric pin mechanism, may be formed separately from the lower column tube 5 that accommodates the column shaft 3 and the torque sensor housing 12 that accommodates the torque sensor input shaft 9. With the above structure, the common lower column tube 5 and the common torque sensor housing 12 may also be used between the steering apparatus 1 that has the eccentric pin mechanism and the steering apparatus 51 that has no eccentric pin mechanism irrespective of whether the steering apparatus has the eccentric pin mechanism.

Furthermore, the steering apparatus according to the aspects of the invention is illustrated as a column assist-type EPS in the embodiment; instead, it may be applied to any types, such as a pinion assist type and a rack assist type, and it may also be applied to a type equipped with a hydraulic power multiplying device.

Note that in the above embodiment, the outer diameter of the first protrusion 6a and the outer diameter of the second protrusion 9a mean the diameters of the outermost peripheral surfaces in the embodiment in which serrations are formed, and mean the diameters of the outermost peripheral surfaces of portions other than the keys 6c and 9b in the embodiment in which the keys 6c and 9b are formed. In addition, in place of serrations or keys, the first protrusion 6a and the second protrusion 9a may have a hexagonal cross section or a tetragonal cross section, and the first recess 3a and the second recess 8a may also have a hexagonal cross section or a tetragonal cross section corresponding to the first protrusion 6a and the second protrusion 9a.

The aspects of the invention relate to a steering apparatus for a vehicle, and make it possible to provide a steering apparatus that uses common components with a relatively simple structure and slight changes and without an increase in manufacturing costs irrespective of whether the steering apparatus has an eccentric pin mechanism. Thus, the aspects of the invention are advantageous when applied to steering apparatuses for various vehicles, such as regular passenger cars, trucks, and buses, and assembling of a steering apparatus to a vehicle.

The invention claimed is:

1. A steering apparatus comprising:
    an eccentric pin mechanism that is formed of an eccentric cam and an adapting plate;
    an input shaft that transmits a steering force input from a steering wheel; and
    an output shaft that transmits a steered force by which wheels are steered, wherein
    mutually fitting connecting portions of the input shaft, output shaft and eccentric pin mechanism are formed such that
    a first connecting portion of the input shaft is connected to a second connecting portion of the output shaft;
    one of the eccentric cam and the adapting plate is connected to the input shaft, and
    the second connecting portion of the output shaft is connected to the other one of the eccentric cam and the adapting plate, wherein
    the output shaft is arranged at a position that is radially offset from the input shaft, when the input shaft and the output shaft are connected to the eccentric pin mechanism.

2. The steering apparatus according to claim 1, wherein
    the eccentric cam has a first protrusion,
    the input shaft has a first recess that constitutes the first connecting portion and that is connected to the first protrusion,
    the adapting plate has a second recess, and
    the output shaft has a second protrusion that constitutes the second connecting portion and that is connected to the second recess.

3. The steering apparatus according to claim 2, wherein the first protrusion and the second protrusion each have a circular column shape, and an outer diameter of the first protrusion is equal to an outer diameter of the second protrusion.

4. The steering apparatus according to claim 3, wherein
    the first protrusion has a key that is key-connected with the first recess, and
    the outer diameter of the first protrusion is the diameter of an outermost peripheral surface of a portion other than the key.

5. The steering apparatus according to claim 4, wherein
    the second protrusion has a key that is key-connected with the second recess, and
    the outer diameter of the second protrusion is the diameter of an outermost peripheral surface of a portion other than the key.

6. The steering apparatus according to claim 3, wherein
    the first protrusion has a serration that is serration-connected with the first recess,
    the second protrusion has a serration that is serration-connected with the second recess, and
    the outer diameter of the first protrusion is the diameter of an outermost peripheral surface of the first protrusion, and the outer diameter of the second protrusion is the diameter of an outermost peripheral surface of the second protrusion.

7. The steering apparatus according to claim 2, wherein the first protrusion and the second protrusion each have a polygonal column shape.

8. The steering apparatus according to claim 1, further comprising:
    an accommodation member that accommodates the eccentric pin mechanism;
    an input-side accommodation member that accommodates the input shaft; and
    an output-side accommodation member that accommodates the output shaft, wherein
    the accommodation member is formed separately from the input-side accommodation member and the output-side accommodation member.

9. The steering apparatus according to claim 1, wherein the output shaft includes a torque detecting portion.

10. A steering apparatus comprising:
    an eccentric pin mechanism that is formed of an eccentric cam and an adapting plate;
    an input shaft that transmits a steering force input from a steering wheel, said input shaft being formed to be connected to one of the eccentric cam and the adapting plate; and
    an output shaft that transmits a steered force by which wheels are steered, said output shaft being formed to be connected to the other one of the eccentric cam and the adapting plate, wherein
    mutually fitting connecting portions of the input shaft, output shaft and eccentric pin mechanism are formed such that
    a first connecting portion of the input shaft is connected to a second connecting portion of the output shaft,
    one of the eccentric cam and the adapting plate is connected to the first connecting portion of the input shaft, and
    the second connecting portion of the output shaft is connected to the other one of the eccentric cam and the adapting plate, wherein
    the output shaft is arranged at a position that is radially offset from the input shaft, when the input shaft and the output shaft are connected to the eccentric pin mechanism.

* * * * *